(12) United States Patent
Otomitsu

(10) Patent No.: US 10,914,899 B2
(45) Date of Patent: Feb. 9, 2021

(54) OPTICAL CONNECTOR AND METHOD FOR CONNECTING OPTICAL CONNECTOR

(71) Applicant: Fujikura Ltd., Tokyo (JP)

(72) Inventor: Takahito Otomitsu, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 16/652,596

(22) PCT Filed: Jun. 28, 2018

(86) PCT No.: PCT/JP2018/024607
§ 371 (c)(1),
(2) Date: Mar. 31, 2020

(87) PCT Pub. No.: WO2019/106870
PCT Pub. Date: Jun. 6, 2019

(65) Prior Publication Data
US 2020/0257064 A1    Aug. 13, 2020

(30) Foreign Application Priority Data

Nov. 29, 2017 (JP) ................................. 2017-229180

(51) Int. Cl.
*G02B 6/40* (2006.01)
*G02B 6/38* (2006.01)

(52) U.S. Cl.
CPC .......... *G02B 6/406* (2013.01); *G02B 6/3879* (2013.01); *G02B 6/3883* (2013.01); *G02B 6/3893* (2013.01); *G02B 6/3885* (2013.01)

(58) Field of Classification Search
CPC .............................. G02B 6/3883; G02B 6/406
See application file for complete search history.

(56) References Cited

U.S. PATENT DOCUMENTS

| | | | | |
|---|---|---|---|---|
| 5,121,454 A | * | 6/1992 | Iwano | G02B 6/3807 385/56 |
| 9,400,357 B2 | * | 7/2016 | Kato | G02B 6/387 |
| 2004/0052472 A1 | * | 3/2004 | Roth | G02B 6/3885 385/56 |
| 2016/0131854 A1 | | 5/2016 | de Jong | |

FOREIGN PATENT DOCUMENTS

| | | |
|---|---|---|
| JP | H11-052181 A | 2/1999 |
| JP | 2015-227938 A | 12/2015 |
| JP | 2018-036589 A | 3/2018 |

* cited by examiner

*Primary Examiner* — Omar R Rojas
(74) *Attorney, Agent, or Firm* — Osha Bergman Watanabe & Burton LLP

(57) ABSTRACT

An optical connector includes: a plurality of first ferrules; a first housing that houses the plurality of first ferrules; a plurality of second ferrules; and a second housing that houses the plurality of second ferrules. The first housing includes: a plurality of first inner housings; and a first outer housing. The optical connector butt-couples the first ferrules and the second ferrules, respectively, by mating the first housing and the second housing. Each of the plurality of first inner housings houses at least one of the plurality of first ferrules. The first outer housing is releasable from the plurality of first inner housings. The plurality of first inner housings and the second housing are mated in stages. When each of the plurality of first inner housings and the second housing are mated, each of the plurality of first inner housings to be mated is released from the first outer housing.

7 Claims, 8 Drawing Sheets

OPTICAL CONNECTOR AND METHOD FOR CONNECTING OPTICAL CONNECTOR

TECHNICAL FIELD

The present disclosure relates to an optical connector and a method for connecting an optical connector.

BACKGROUND ART

As an example of an optical connector that houses a ferrule in a housing so as to be retractable, for example, a mechanically transferable (MT) optical connector (optical connector defined by JIS C 5981) has been known. In such an optical connector, endfaces of ferrules that hold end parts of optical fibers butt against each other, thereby causing endfaces of the optical fibers held by the ferrules to physically butt against each other, so that the optical fibers are connected to each other.

In relation to such an optical connector, Patent Literature 1 discloses an optical connector in which a plurality of housing units (reception-side outer housing units 128 and movable-side outer housing unit 138s) each housing, in a housing, a ferrule biased forward by a spring are aligned in a width direction of the ferrule (see FIGS. 11 to 13). In such an optical connector, by mating a plug-side housing (a movable-side housing 131) with a receptacle-side housing (a reception-side housing 121), it is possible to collectively butt-couple the ferrules in the plurality of aligned housing units.

CITATION LIST

Patent Literature

Patent Literature 1: JP 2015-227938A

In the optical connector described in Patent Literature 1, the number of ferrules that can collectively butt-coupled to each other in one optical connector is increased by increasing the number of housing units to be aligned and/or the number of ferrules housed in each of the housing units. In this way, multicore optical connectors can be connected to each other. However, when the multicore optical connectors are connected to each other as such, the number of ferrules to be pushed back against an elastic force of springs is increased. This increases a force for mating housings accordingly.

SUMMARY

In one or more embodiments of the present disclosure, a multicore optical connector may be easily attached or detached.

An optical connector according to one or more embodiments of the present disclosure that butt-couples a plurality of first ferrules housed in a first housing and a plurality of second ferrules housed in a second housing, respectively, by mating the first housing and the second housing, wherein: the first housing includes a plurality of first inner housings and a first outer housing, the plurality of first inner housings each housing at least one first ferrule of the plurality of first ferrules, the first outer housing being releasable from the plurality of first inner housings, the plurality of first inner housings and the second housing are mated in stages, and when each of the plurality of first inner housings and the second housing are mated, a first inner housing to be mated of the first inner housings is released from the first outer housing (i.e., each of the first inner housings to be mated is released from the first outer housing).

Other features of the disclosure are made clear by the following description and the drawings.

According to one or more embodiments of the present disclosure, a multicore optical connector can be easily attached and detached.

DETAILED DESCRIPTION

Figure 1:
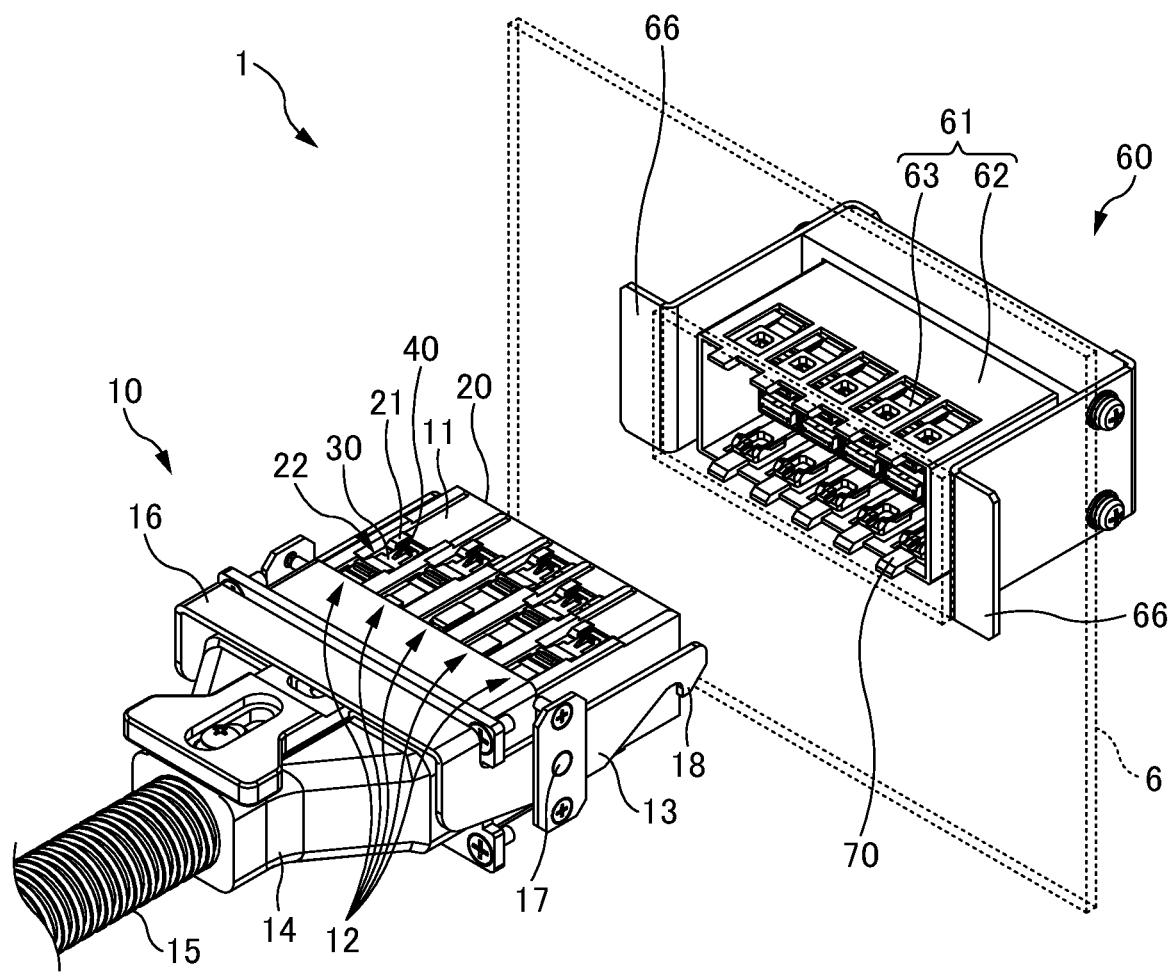
FIG. 1 is an overall perspective view of an optical connector 1 according to one or more embodiments.

At least the following matters are made clear from the following description and the drawings.

An optical connector is made clear which butt-couples a plurality of first ferrules housed in a first housing and a plurality of second ferrules housed in a second housing, respectively, by mating the first housing and the second housing, wherein: the first housing includes a plurality of first inner housings and a first outer housing, the plurality of first inner housings each housing at least one first ferrule of the plurality of first ferrules, the first outer housing being releasable from the plurality of first inner housings, the plurality of first inner housings and the second housing are mated in stages, and when each of the plurality of first inner housings and the second housing are mated, a first inner housing to be mated of the first inner housings is released from the first outer housing. According to this optical connector, a multicore optical connector can be easily attached and detached.

The plurality of first inner housings may include one first inner housing and another first inner housing, when the first housing and the second housing are mated, the one first inner housing may mate with the second housing and thereafter the first ferrule of the other first inner housing may start to butt against corresponding at least one second ferrule of the plurality of second ferrules of the second housing. This can easily attach and detach a multicore optical connector.

The plurality of first inner housings may include one first inner housing and another first inner housing, when the first housing and the second housing are mated, the one first inner housing may be released from the first outer housing and thereafter the first ferrule of the other first inner housing may start to butt against corresponding at least one second ferrule of the plurality of second ferrules of the second housing. This can easily attach and detach a multicore optical connector.

The plurality of first inner housings may include at least three first inner housings, the three first inner housings may be aligned in a perpendicular direction that is perpendicular to a direction in which the first housing and the second housing are mated, and when the first housing and the second housing are mated, the three first inner housings may be released from the first outer housing in order of 1) a first one, of the three first inner housings, located at the center in the first housing, 2) a second one, of the three first inner housings, different from the first one located at the center, and 3) a third one, of the three first inner housings, located on an opposite side to the second one with respect to the first one located at the center, in the perpendicular direction. This can reduce an inclination of the first connector when the first connector and the second connector are connected to each other.

When the first housing and the second housing are unmated after being mated, the plurality of first inner housings and the first outer housing may be locked in stages. This can easily attach and detach a multicore optical connector.

An optical connector is made clear which butt-couples a plurality of first ferrules housed in a first housing and a plurality of second ferrules housed in a second housing, respectively, by mating the first housing and the second housing, wherein: the first housing includes a plurality of first inner housings and a first outer housing, the plurality of first inner housings each housing at least one first ferrule of the plurality of first ferrules, and the first outer housing configured to be locked to the plurality of first inner housings, and, when the first housing and the second housing are unmated after being mated, the plurality of first inner housings and the first outer housing are locked in stages. According to this optical connector, a multicore optical connector can be easily attached and detached.

A method for connecting an optical connector is made clear which butt-couples a plurality of first ferrules housed in a first housing and a plurality of second ferrules housed in a second housing, respectively, by mating the first housing and the second housing, the method comprising: preparing the first housing, the first housing including a plurality of first inner housings and a first outer housing, the plurality of first inner housings each housing at least one first ferrule of the plurality of first ferrules, the first outer housing being releasable from the plurality of first inner housings; mating the plurality of first inner housings and the second housing in stages; and when each of the plurality of first inner housings and the second housing are mated, releasing locking between a first inner housing to be mated of the first inner housings and the first outer housing (i.e., releasing locking between each of the first inner housings to be mated and the first outer housing). According to such a method for connecting an optical connector, a multicore optical connector can be easily attached and detached.

Overall Configuration of Optical Connector 1 in accordance with one or more embodiments is described below.

Figure 2:
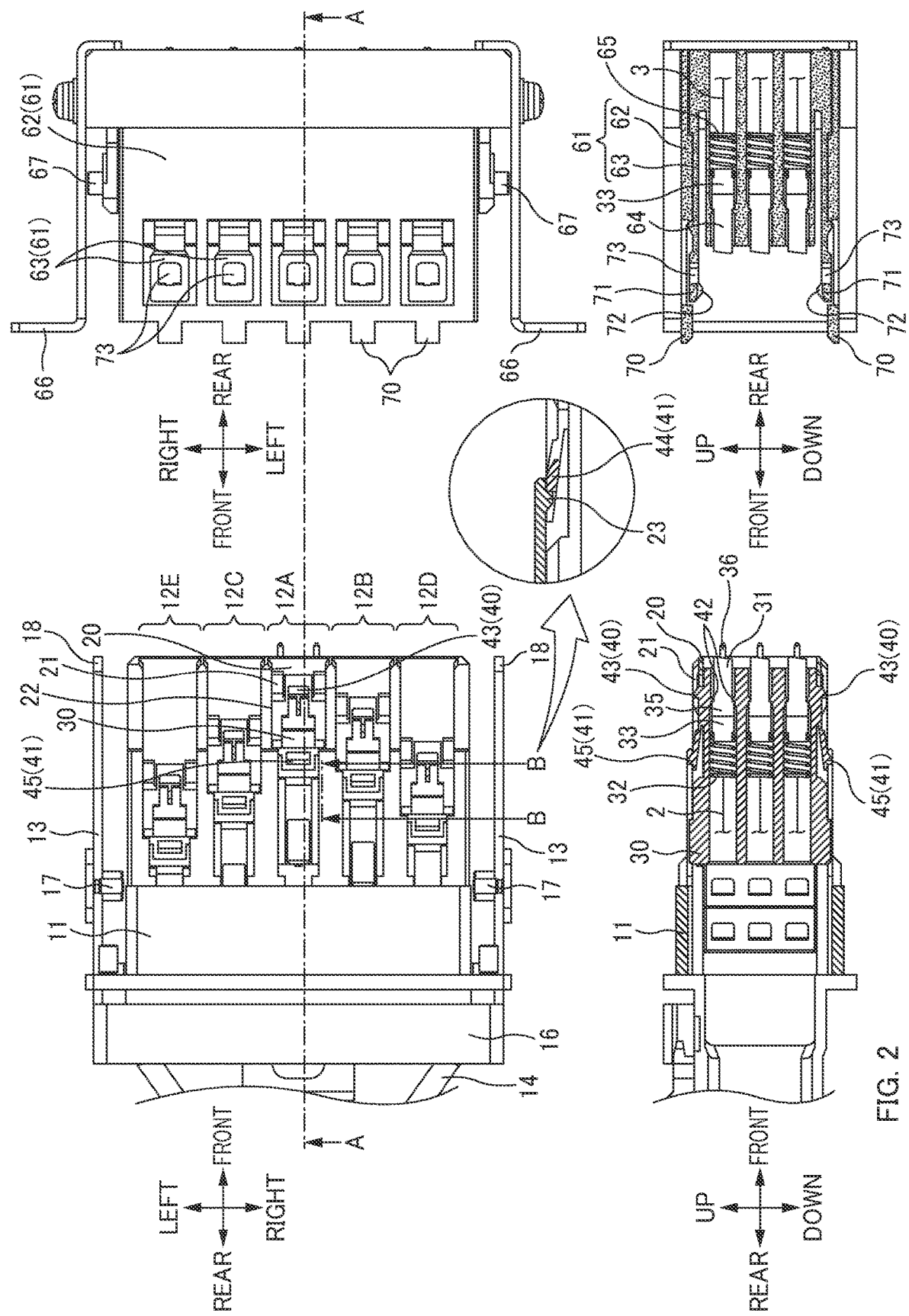
FIG. 2 illustrates a front view of the optical connector 1 according to one or more embodiments, a cross-sectional view taken along an A-A line, and a cross-sectional view taken along a B-B line.

FIG. 1 is an overall perspective view of an optical connector 1 according to one or more embodiments. FIG. 2 illustrates a front view of the optical connector 1 according to one or more embodiments, a cross-sectional view taken along an A-A line, and a cross-sectional view taken along a B-B line. Note that FIGS. 1 and 2 illustrate a state before the optical connector 1 is connected (a state in which the optical connector 1 is disconnected).

In the following description, directions will be defined as illustrated in the drawings. Specifically, a direction of attaching/detaching the optical connector 1 is a "front-rear direction". For each of an optical plug 10 and an optical receptacle 60, a side on which the optical plug 10 or the optical receptacle 60 is to be connected is the "front" and the opposite side is the "rear". A width direction of a ferrule (a plug-side ferrule 31 or a receptacle-side ferrule 64) is a "left-right direction". Note that, in the plug-side ferrule 31, a direction in which a pair of ferrule pins 36 is aligned is also the "left-right direction". A thickness direction of the ferrule (the plug-side ferrule 31 or the receptacle-side ferrule 64) is an "up-down direction". Note that the up-down direction is also a direction orthogonal to the "front-rear direction" and the "left-right direction".

The optical connector 1 is a connector for connecting multiple optical fibers. As illustrated in FIG. 2, in the optical connector 1 according to one or more embodiments, three of 16-optical-fiber-type ferrules (the plug-side ferrules 31 or the receptacle-side ferrules 64) are aligned in the up-down direction, and five of 16-optical-fiber-type ferrules are aligned in the left-right direction. Accordingly, in the optical connector according to one or more embodiments, a total of 240 optical fibers can be connected. However, the number of optical fibers held by each ferrule and the number of ferrules of the optical connector 1 are not limited thereto.

The optical connector 1 includes the optical plug 10 (hereinafter may be referred to as a "first connector") and the optical receptacle 60 (hereinafter may be referred to as a "second connector").

Configuration of Optical Plug 10

The optical plug 10 is a connector on a movable side that is to be used when the optical connector 1 is connected. In one or more embodiments, an operator holds the optical plug 10 by hand, and connects the optical connector 1 by inserting the optical plug 10 into the optical receptacle 60 on a reception side. The operator disconnects the optical connector 1 by pulling out the optical plug 10 from the optical receptacle 60.

The optical plug 10 includes a plug-side outer housing 11 (hereinafter may be referred to as a "first outer housing"), a plurality of plug-side inner connectors 12 (hereinafter may be referred to as "first inner connectors", connection holding parts 13, a cover part 14, and a cable tube part 15 (see FIGS. 1 and 2).

The plug-side outer housing 11 is a member that collectively houses the plurality of plug-side inner connectors 12. The plug-side outer housing 11 is a tubular member extending in the front-rear direction, and collectively houses the plurality of (herein, five) plug-side inner connectors 12 therein. As illustrated in FIGS. 1 and 2, the pair of connection holding parts 13 is provided on left and right side-parts of the plug-side outer housing 11. The cover part 14 is provided on a rear side of the plug-side outer housing 11. As illustrated in FIGS. 1 and 2, a plurality of window parts 22 corresponding to the number of the plug-side inner connectors 12 to be housed are provided in the plug-side outer housing 11, and part (for example, an engaging section 40) of each of the plug-side inner connectors 12 (a plug-side inner housing 30) is exposed from each of the window parts 22. Other detailed configuration of the plug-side outer housing 11 will be described later.

The plug-side inner connector 12 is a unit including at least one ferrule or more of the plurality of ferrules (the plug-side ferrules 31 described later) included in the optical plug 10. As illustrated in FIGS. 1 and 2, in the optical plug 10 according to one or more embodiments, five plug-side inner connectors 12 are aligned in the left-right direction in the plug-side outer housing 11. However, the number and direction of alignment of the plug-side inner connectors 12 are not limited thereto.

In the following description, the five plug-side inner connectors 12 have respective reference signs provided with indexes "A" to "E". Members and sections of the plug-side inner connectors 12 also have respective reference signs provided with the indexes "A" to "E" described above. When members and sections common to the five plug-side inner connectors 12 are indicated, the indexes may not be provided. For example, a plug-side inner housing 30A to a plug-side inner housing 30E may be simply referred to as the "plug-side inner housing 30".

As illustrated in FIGS. 1 and 2, in one or more embodiments, not only the plurality of plug-side inner connectors 12 are arranged in the left-right direction in the plug-side outer housing 11, but also are arranged at positions in the front-rear direction in order from the plug-side inner connector 12A to the plug-side inner connector 12E from the front side in the plug-side outer housing 11. In this way, the plug-side inner connectors 12 mate with a receptacle-side housing 61 in stages in order from the plug-side inner connector 12 located at the center to the plug-side inner connectors 12 located on both left and right ends in the plug-side outer housing 11 (described later).

Each of the plug-side inner connectors 12 includes the plug-side inner housing 30 (hereinafter may be referred to as a "first inner housing"), the plug-side ferrules 31 (hereinafter may be referred to as "first ferrules"), and plug-side springs 32 (hereinafter may be referred to as "first springs") (see FIG. 2).

The plug-side inner housing 30 is a member that houses the plug-side ferrules 31 and the plug-side springs 32. The plug-side inner housing 30 is a tubular member extending in the front-rear direction, and houses the plurality of (herein, three) plug-side ferrules 31 therein. As illustrated in FIGS. 1 and 2, the plug-side inner housings 30 are housed in the plug-side outer housing 11. Other detailed configuration of the plug-side inner housing 30 will be described later. Note that the plurality of plug-side inner housings 30 and the plug-side outer housing 11 may be collectively referred to as a plug-side housing (hereinafter may be referred to as a "first housing").

Each of the plug-side ferrules 31 is a member that holds end parts of optical fibers 2 on the optical plug 10 side. The plug-side ferrule 31 is, for example, a ferrule of a mechanically transferable (MT) optical connector (optical connector defined by JIS C 5981). As illustrated in FIG. 2, in the optical plug 10 according to one or more embodiments, three plug-side ferrules 31 are arranged in the up-down direction in the plug-side inner housing 30. However, the number and direction of alignment of the plug-side ferrules 31 are not limited thereto.

A front end surface of each of the plug-side ferrules 31 is a ferrule connection endface that is used when the optical connector 1 is connected. A ferrule flange part 35 is formed on the rear side of the plug-side ferrule 31. The ferrule flange part 35 is a flange section that protrudes outward from a peripheral surface of a body of the plug-side ferrule 31. The ferrule flange part 35 contacts a coming-off prevention protrusion 42 that is formed inside the plug-side inner housing 30, thereby preventing the plug-side ferrule 31 that is pressed forward by the plug-side spring 32 from coming off from the front side.

The plug-side spring 32 is an elastic member for restoring a positional relationship between the plug-side ferrule 31 and the plug-side inner housing 30. The plug-side spring 32 is disposed in a compressible state between a pin clamp 33 provided on the rear of the ferrule flange part 35 and a spring reception part (not illustrated) fixed to the plug-side inner housing 30 (see FIG. 2). Specifically, a front end part of the plug-side spring 32 is held by the pin clamp 33, and a rear end part of the plug-side spring 32 is held by the spring reception part (not illustrated). A front end surface of the receptacle-side ferrule 64 buts against a front end surface of the plug-side ferrule 31 at the time of connection of the optical connector 1, and when the plug-side ferrule 31 moves rearward with respect to the plug-side inner housing 30, the plug-side spring 32 is compressed and deformed via the pin clamp 33. This results in the plug-side ferrule 31 being biased forward via the pin clamp 33 by an elastic force of the compressed and deformed plug-side spring 32. Further, it is possible to press the plug-side ferrule 31 rearward against the elastic force of the plug-side spring 32.

The connection holding parts 13 are members that hold a connected state of the optical connector 1. The connection holding parts 13 hold the connected state of the optical connector 1 by holding a state in which a housing (the plug-side outer housing 11 and the plug-side inner housing 30) of the optical plug 10 mates with a housing (the receptacle-side housing 61) of the optical receptacle 60. The connection holding parts 13 are respectively attached to the left and right of the plug-side outer housing 11. As illustrated in FIG. 1 or 2, a pair of latch parts 18 is provided on parts on the front side with respect to the places at which the connection holding parts 13 are attached to the plug-side outer housing 11. A rear part with respect to the places at which the connection holding parts 13 are attached to the plug-side outer housing 11 is an operating lever 16 provided to connect the pair of latch parts 18. In one or more embodiments, the operator presses the operating lever 16 downward when the optical connector 1 is connected, thereby causing the connection holding parts 13 to rotate about an operating rotation shaft 17 that is provided through the places at which the connection holding parts 13 are attached to the plug-side outer housing 11, and the pair of latch parts 18 is lifted. Then, the operator stops pressing the operating lever 16 downward after the connection of the optical connector 1, thereby being able to cause the pair of latch parts 18 to latch protrusions 67 (described later) of the optical receptacle 60. This holds the state in which the housing (the plug-side outer housing 11 and the plug-side inner housing 30) of the optical plug 10 mates with the housing (the receptacle-side housing 61) of the optical receptacle 60, thereby being able to hold the connected state of the optical connector 1. Holding the connected state of the optical connector 1 can reduce, for example, an unexpected disconnection of the optical connector 1 caused by application of tensile stress to the cable tube part 15 that is connected to the optical plug 10.

The cover part 14 and the cable tube part 15 are members that house the optical fibers 2 of the optical plug 10. The cover part 14 also serves as a section to be held by the operator by hand when the optical connector 1 is attached and detached. The cover part 14 is attached to the rear side of the plug-side outer housing 11. The cable tube part 15 is attached to the rear side of the cover part 14. As illustrated in FIG. 1, the cable tube part 15 is formed in a bellows shape, but the shape of the cable tube part 15 is not limited thereto.

Configuration of Optical Receptacle 60

The optical receptacle 60 is a connector on the reception side to be used when the optical connector 1 is connected. In one or more embodiments, the optical connector 1 is connected by inserting the optical plug 10 into the optical receptacle 60. The optical connector 1 is disconnected by pulling out the optical plug 10 from the optical receptacle 60.

The optical receptacle 60 includes a receptacle-side outer housing 62, a plurality of receptacle-side inner housings 63, the plurality of receptacle-side ferrules 64 (hereinafter may be referred to as "second ferrules"), a plurality of receptacle-side springs 65 (hereinafter may be referred to as "second springs"), panel attachment parts 66, and the latch protrusions 67.

The receptacle-side outer housing 62 is a member that houses the receptacle-side inner housings 63. The receptacle-side outer housing 62 is a tubular member extending in the front-rear direction, and houses therein the plurality of (herein, five) receptacle-side inner housings 63 aligned in the left-right direction. As illustrated in FIG. 2, the panel attachment parts 66 are respectively attached to left and right side-parts of the receptacle-side outer housing 62.

The receptacle-side inner housings 63 are members that house the plurality of receptacle-side ferrules 64 and the plurality of receptacle-side springs 65. The receptacle-side inner housing 63 is a tubular member extending in the front-rear direction, and houses therein the plurality of (herein, three) receptacle-side ferrules 64 and the plurality of (herein, three) receptacle-side springs 65 in the up-down direction. Note that the receptacle-side inner housing 63 may be formed integrally with the receptacle-side outer housing 62. A plurality of receptacle-side inner housings 63 and the receptacle-side outer housing 62 may be collectively referred to as the receptacle-side housing 61 (hereinafter may be referred to as a "second housing"). Other detailed configuration of the receptacle-side outer housing 62 and the receptacle-side inner housing 63 will be described later.

Each of the receptacle-side ferrules 64 is a member that holds end parts of optical fibers 3 on the optical receptacle 60 side. The receptacle-side spring 65 is an elastic member for restoring a positional relationship between the receptacle-side ferrule 64 and the receptacle-side inner housing 63. Note that the receptacle-side ferrule 64 and the receptacle-side spring 65 have similar configurations as those of the plug-side ferrule 31 and the plug-side spring 32, and thus description will be omitted. Note that, in the following description, the receptacle-side inner housing 63 and the receptacle-side ferrule 64 may be collectively referred to as a receptacle-side sub-connector (hereinafter may be referred to as a "second sub-connector"). The receptacle-side sub-connector may further include the receptacle-side spring 65. The optical receptacle 60 in one or more embodiments includes the plurality of (five) receptacle-side sub-connectors each including the plurality of (three) receptacle-side ferrules 64.

The panel attachment parts 66 are members for fixing the optical receptacle 60 to a front panel 6. The receptacle-side outer housing 62 is attached to the front panel 6 by the panel attachment parts 66, thereby fixing the optical receptacle 60 to the front panel 6. The latch protrusions 67 are places at which the pair of latch parts 18 provided on the connection holding parts 13 of the optical plug 10 is hooked. The latch protrusions 67 are respectively provided on the left and right of the receptacle-side outer housing 62.

Procedure of Connecting Optical Connector 1

The plug-side inner connectors 12 described above mate with the receptacle-side housing 61, and thus the plug-side ferrules 31 of the optical plug 10 are butt-coupled to the receptacle-side ferrules 64 of the optical receptacle 60. As described above, in one or more embodiments, the plug-side inner connectors 12 mate with the receptacle-side housing 61 in stages in order from the plug-side inner connector 12 located at the center to the plug-side inner connectors 12 located on both left and right ends in the plug-side outer housing 11. Then, all of the plug-side inner connectors 12 (the plug-side inner connector 12A to the plug-side inner connector 12E) of the optical plug 10 mate with the receptacle-side housing 61, thereby connecting the optical connector 1.

Figure 3A:
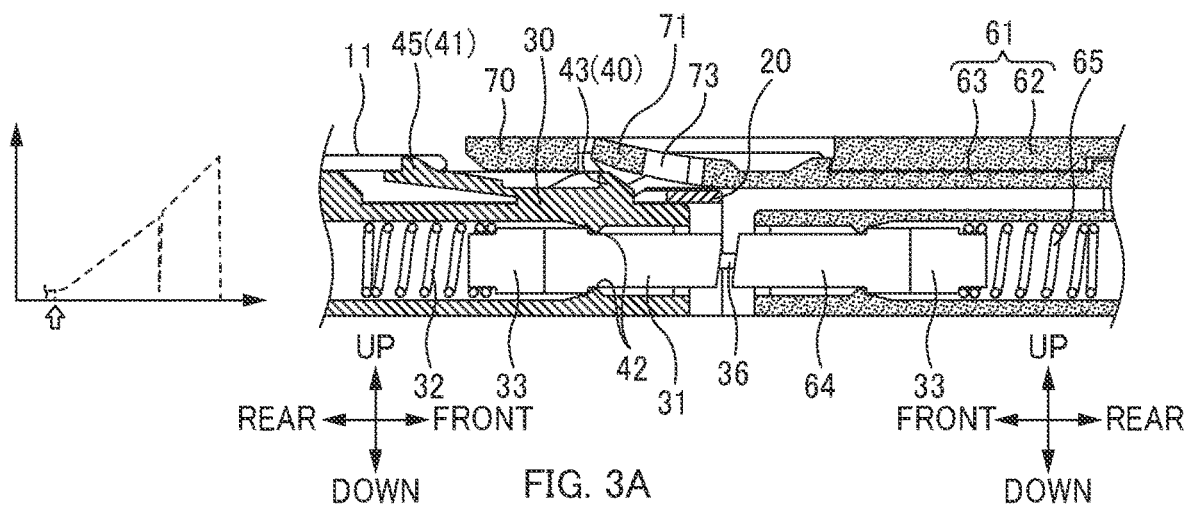
FIGS. 3A to 3C are cross-sectional views illustrating a situation until a housing engagement state in connection of the optical connector 1 according to one or more embodiments.
Figure 3B:
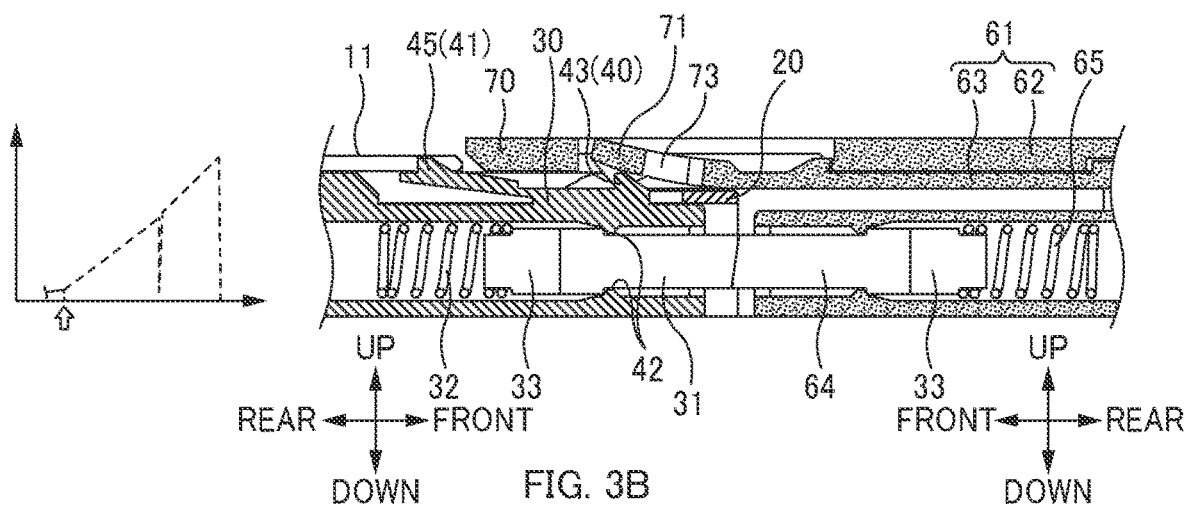
Figure 3C:
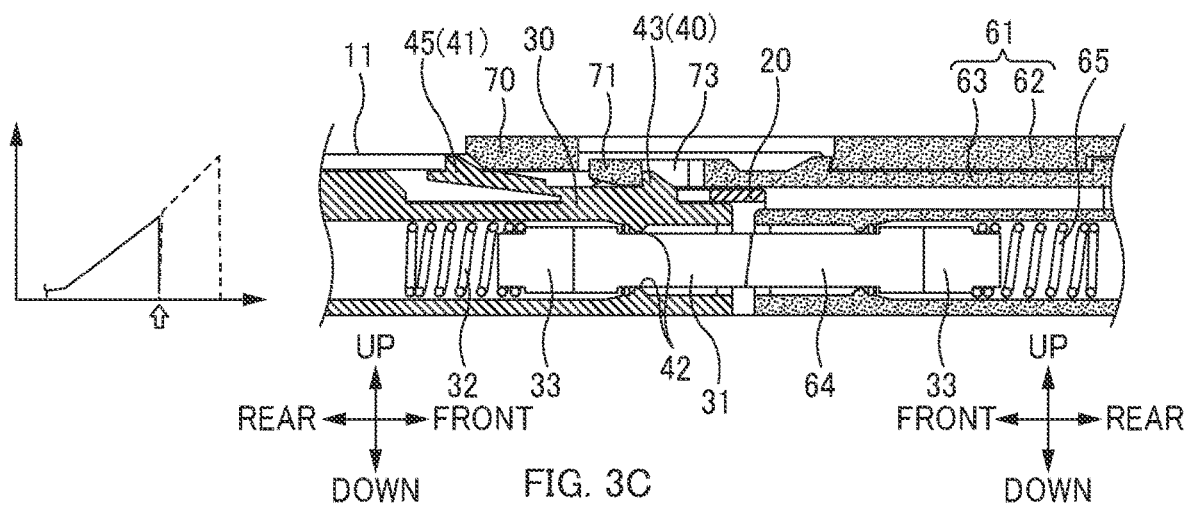
Figure 4A:
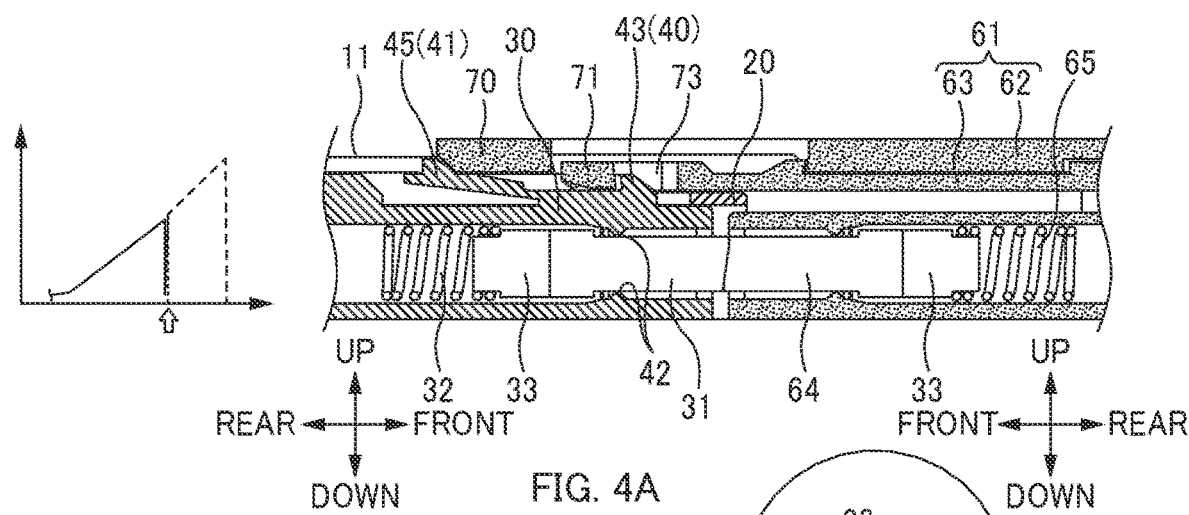
FIGS. 4A to 4C are cross-sectional views illustrating a situation until a floating state from the housing engagement state in the connection of the optical connector 1 according to one or more embodiments.
Figure 4B:
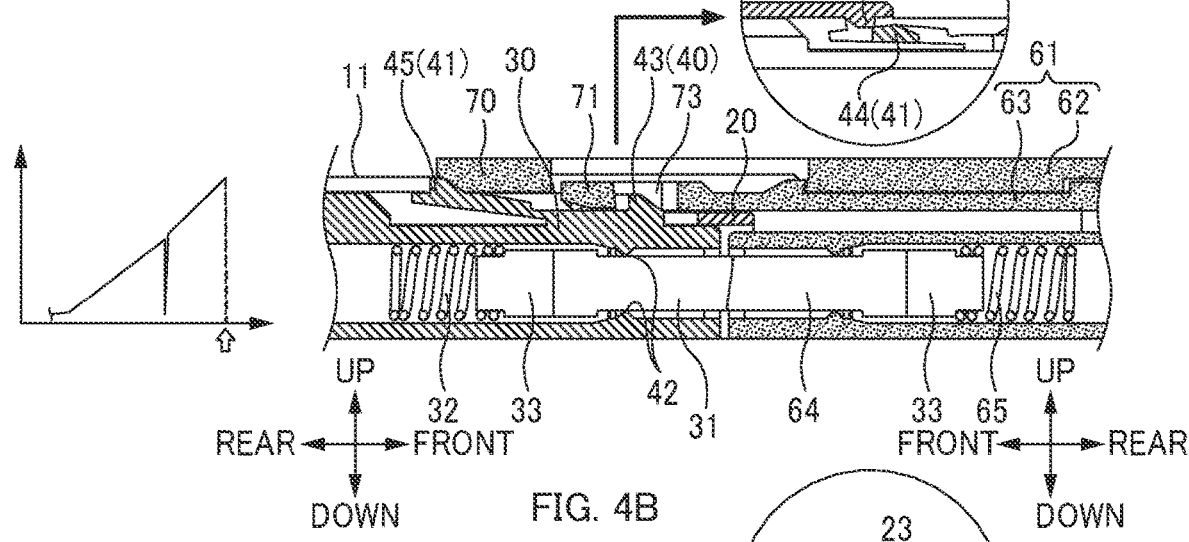
Figure 4C:
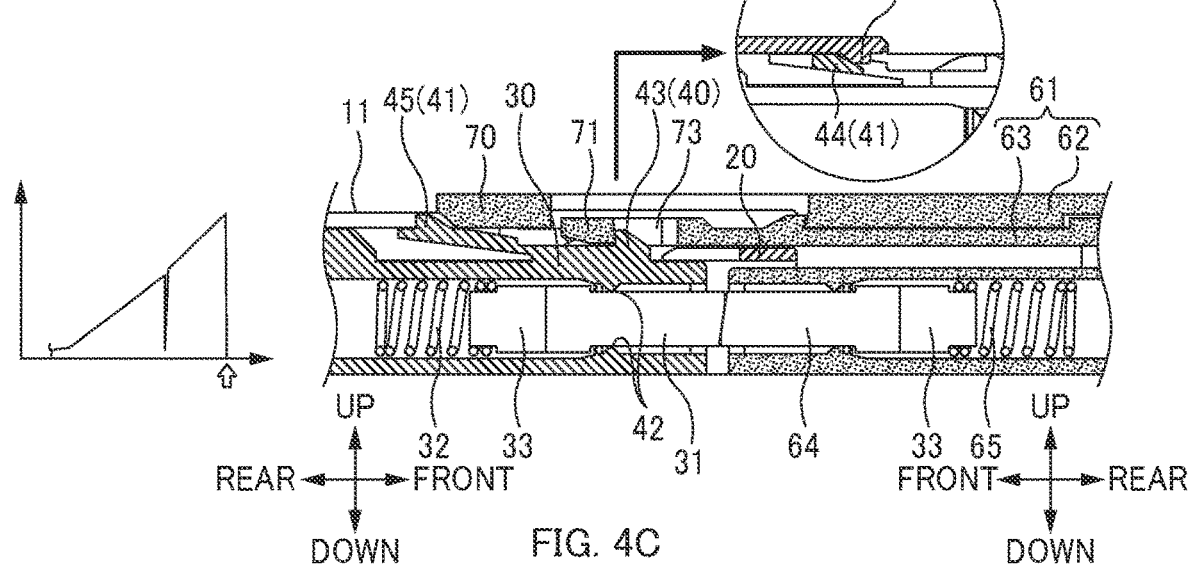

FIG. 3 (FIGS. 3A to 3C) and FIG. 4 (FIGS. 4A to 4C) illustrate a procedure of mating the plug-side inner connector 12A and the receptacle-side housing 61 in the connection procedure of the optical connector 1. When the plug-side inner connector 12A is mated with the receptacle-side housing 61, first, a "housing engagement state" is established which is a state in which the engaging section 40 of the plug-side inner housing 30 (plug-side inner connector 12) engages with an engaged section 71 of the receptacle-side inner housing 63 (receptacle-side housing 61) (see FIG. 3C). Next, an elastic locking section 41 of the plug-side inner housing 30 having been locked by an locked section 23 of the plug-side outer housing 11, is released therefrom, thereby entering a "floating state", in which the plug-side inner connector 12 is floatable with respect to the plug-side outer housing 11. Note that, in one or more embodiments, as described later, the floating state is a state in which an engagement piece 43 of the engaging section 40 of the plug-side inner housing 30 engages again with an engagement hole 73 of the engaged section 71 of the receptacle-side inner housing 63, and the plug-side inner housing 30 and the plug-side outer housing 11 have a predetermined positional relationship (see FIG. 4C). The plug-side inner connector 12 in the floating state can retract with respect to the plug-side outer housing 11. Thus, all of the plug-side inner connectors 12 (the plug-side inner connector 12A to the plug-side inner connector 12E) of the optical plug 10 can mate with the receptacle-side housing 61 in stages (described later). In the following description, being in the housing engagement state may be referred to as "first-mating" in which the plug-side inner connector 12 is mated with the receptacle-side housing 61. Being in the floating state may be referred to as "second-mating" in which the plug-side inner connector 12 is mated with the receptacle-side housing 61. Furthermore, the first-mating, the second-mating, or the first-mating and second-mating collectively may be simply referred to as "mating" or "connecting".

Housing Engagement State

FIGS. 3A to 3C are cross-sectional views illustrating a situation until the housing engagement state has been established, in the connection of the optical connector 1 according to one or more embodiments. Note that a relationship between a position of the optical plug 10 with respect to the optical receptacle 60 and stress received by the optical plug 10 is illustrated on the left in each of FIGS. 3A to 3B.

FIG. 3A illustrates a state before an endface of the plug-side ferrule 31 and an endface of the receptacle-side ferrule 64 butt against each other. As illustrated in FIG. 3A, the pair of ferrule pins 36 of the plug-side ferrule 31 is inserted into ferrule holes (not illustrated) of the receptacle-side ferrule 64. The engaged section 71 is elastically deformed upward such that an engagement projection 72 provided on the receptacle-side inner housing 63 runs up onto a projection 21 provided on the plug-side outer housing 11 (see FIG. 2 for the projection 21). In this way, when the optical plug 10 is further moved toward the optical receptacle 60, the engaged section 71 of the optical receptacle 60 can run over the engagement piece 43 of the engaging section 40 of the optical plug 10.

FIG. 3B illustrates a state in which the endface of the plug-side ferrule 31 and the endface of the receptacle-side ferrule 64 butt against each other. As described above, the plug-side ferrule 31 is pressed forward by the plug-side spring 32. The receptacle-side ferrule 64 is also pressed forward by the receptacle-side spring 65. Thus, when moving the optical plug 10 toward the optical receptacle 60, the operator is applied with elastic force of the plug-side spring 32 and the receptacle-side spring 65 that are compressed and deformed. In other words, the operator needs to move the optical plug 10 toward the optical receptacle 60 against the elastic force of the plug-side spring 32 and the receptacle-side spring 65. Accordingly, as illustrated in the left diagram of FIG. 3B, the stress received by the optical plug 10 increases thereafter according to the movement of the optical plug 10.

FIG. 3C illustrates a state in which the engagement piece 43 of the engaging section 40 of the plug-side inner housing 30 engages with the engagement hole 73 of the engaged section 71 of the receptacle-side inner housing 63. In other words, FIG. 3C illustrates the housing engagement state between the plug-side inner connector 12 and the receptacle-side housing 61. This engagement fixes an abutment plane (mechanical reference plane) of the endfaces of the plug-side ferrule 31 and the receptacle-side ferrule 64. In the state in which the engagement piece 43 of the engaging section 40 engages with the engagement hole 73 of the engaged section 71, the plug-side inner housing 30 and the receptacle-side inner housing 63 have a predetermined positional relationship while the endfaces of the plug-side ferrule 31 and the receptacle-side ferrule 64 butt against each other, and the plug-side spring 32 and the receptacle-side spring 65 are compressed and deformed by a predetermined amount. Thus, in the state in which the engagement piece 43 of the engaging section 40 engages with the engagement hole 73 of the engaged section 71, the plug-side ferrule 31 and the receptacle-side ferrule 64 are fixed in a state of butting against each other with a predetermined pressing force by the plug-side spring 32 and the receptacle-side spring 65. In other words, at a stage of FIG. 3C, the elastic force of the plug-side spring 32 and the receptacle-side spring 65 is applied to the place where the engaging section 40 of the plug-side inner housing 30 engages with the engaged section 71 of the receptacle-side inner housing 63. Thus, as illustrated in the left diagram of FIG. 3C, the stress received by the optical plug 10 significantly decreases.

At the stage of FIG. 3C, a locking piece 44 of the elastic locking section 41 provided on the plug-side inner housing 30 is locked by the locked section 23 of the plug-side outer housing 11, and the plug-side inner housing 30 and the plug-side outer housing 11 are in an locked state (a state in which they cannot move relative to each other).

Floating State

FIGS. 4A to 4C are cross-sectional views illustrating a situation from the housing engagement state to the floating state, in the connection of the optical connector 1 according to one or more embodiments. Note that a relationship between a position of the optical plug 10 with respect to the optical receptacle 60 and stress received by the optical plug 10 is illustrated on the left in each of FIGS. 4A to 4B.

FIG. 4A illustrates a state in which a pressing part 70 of the receptacle-side outer housing 62 abuts a pressed protrusion 45 of the elastic locking section 41 of the plug-side inner housing 30. When the operator further moves the optical plug 10 toward the optical receptacle 60 from the stage in FIG. 3C described above, the housing engagement state is temporarily released. In other words, the engagement piece 43 of the engaging section 40 of the plug-side inner housing 30 leaves the state of engaging with the engagement hole 73 of the engaged section 71 of the receptacle-side inner housing 63, and enters a state of receiving again the elastic force of the plug-side spring 32 and the receptacle-side spring 65 that are compressed and deformed. Furthermore, in the state illustrated in FIG. 4A, the plug-side spring 32 and the receptacle-side spring 65 are compressed and deformed more than those immediately before entering the housing engagement state. Accordingly, as illustrated in the left diagram of FIG. 4A, the stress received by the optical plug 10 increases more than the stress immediately before the housing engagement state. Note that, in this stage, the pressing part 70 of the receptacle-side outer housing 62 abuts the pressed protrusion 45 of the elastic locking section 41 of the plug-side inner housing 30, but the pressing part 70 does not elastically deform the elastic locking section 41 toward the plug-side ferrule 31 side, and thus an unlocked state has not been entered yet. Thus, in this stage, a positional relationship between the plug-side inner housing 30 and the plug-side outer housing 11 is still fixed.

FIG. 4B illustrates a state immediately before the locking piece 44 of the elastic locking section 41 of the plug-side inner housing 30 is unlocked from the locked section 23 of the plug-side outer housing 11. In this stage, the plug-side spring 32 and the receptacle-side spring 65 are in a state of being compressed and deformed the most. Accordingly, as illustrated in the left diagram in FIG. 4B, the stress received by the optical plug 10 increases the most. The pressing part 70 of the receptacle-side outer housing 62 is in a state of elastically deforming the elastic locking section 41 of the plug-side inner housing 30 toward the plug-side ferrule 31 side (lower side in FIG. 4B). Note that, when the operator further moves the optical plug 10 toward the optical receptacle 60 from the stage in FIG. 4B, the pressing part 70 of the receptacle-side outer housing 62 further elastically deforms the elastic locking section 41 of the plug-side inner housing 30 toward the plug-side ferrule 31 side (lower side in FIG. 4B), thereby unlocking the locking of the elastic locking section 41 of the plug-side inner housing 30 with the locked section 23 of the plug-side outer housing 11 and entering the unlocked state. This releases the plug-side inner housing 30 having been locked to the plug-side outer housing 11 therefrom, and enables the plug-side inner housing 30 to move rearward (to the side opposite to the optical receptacle 60) with respect to the plug-side outer housing 11.

FIG. 4C illustrates a state in which the engagement piece 43 of the engaging section 40 of the plug-side inner housing 30 engages again with the engagement hole 73 of the engaged section 71 of the receptacle-side inner housing 63. When the unlocked state is established as illustrated in FIG. 4B, the plug-side inner housing 30 can move rearward (to the side opposite to the optical receptacle 60) with respect to the plug-side outer housing 11. Thus, as illustrated in FIG. 4C, the plug-side inner housing 30 moves rearward (opposite side to the optical receptacle 60) with respect to the plug-side outer housing 11 by the elastic force of the plug-side spring 32 and the receptacle-side spring 65, and the engagement piece 43 of the engaging section 40 of the plug-side inner housing 30 enters the state of engaging again with the engagement hole 73 of the engaged section 71 of the receptacle-side inner housing 63. As a result, the plug-side inner housing 30 and the plug-side outer housing 11 have the predetermined positional relationship again, and the plug-side spring 32 and the receptacle-side spring 65 enter a state of being compressed and deformed again by the predetermined amount. Thus, the plug-side ferrule 31 and the receptacle-side ferrule 64 enter a state of butting against each other again with the predetermined pressing force by the plug-side spring 32 and the receptacle-side spring 65 (floating state). In the floating state, while the plug-side inner housing 30 and the receptacle-side inner housing 63 maintain the predetermined positional relationship (the state in which the plug-side ferrule 31 and the receptacle-side ferrule 64 butt against each other with the predetermined pressing force by the plug-side spring 32 and the receptacle-side spring 65), the plug-side inner connector 12 (plug-side inner housing 30) can move rearward (to the side opposite to the optical receptacle 60) with respect to the plug-side outer housing 11. Accordingly, the elastic force of the plug-side spring 32 and the receptacle-side spring 65 is not applied to the optical plug 10. Thus, as illustrated in the left diagram in FIG. 4C, the stress received by the optical plug 10 significantly decreases again.

Note that, as described above, the operator moves the optical plug 10 to the optical receptacle 60 in the operation of connecting the optical connector 1. At this time, the operator can complete the connecting operation only by moving the optical plug 10 toward the optical receptacle 60 without being aware of the housing engagement state and the floating state.

Figure 5:
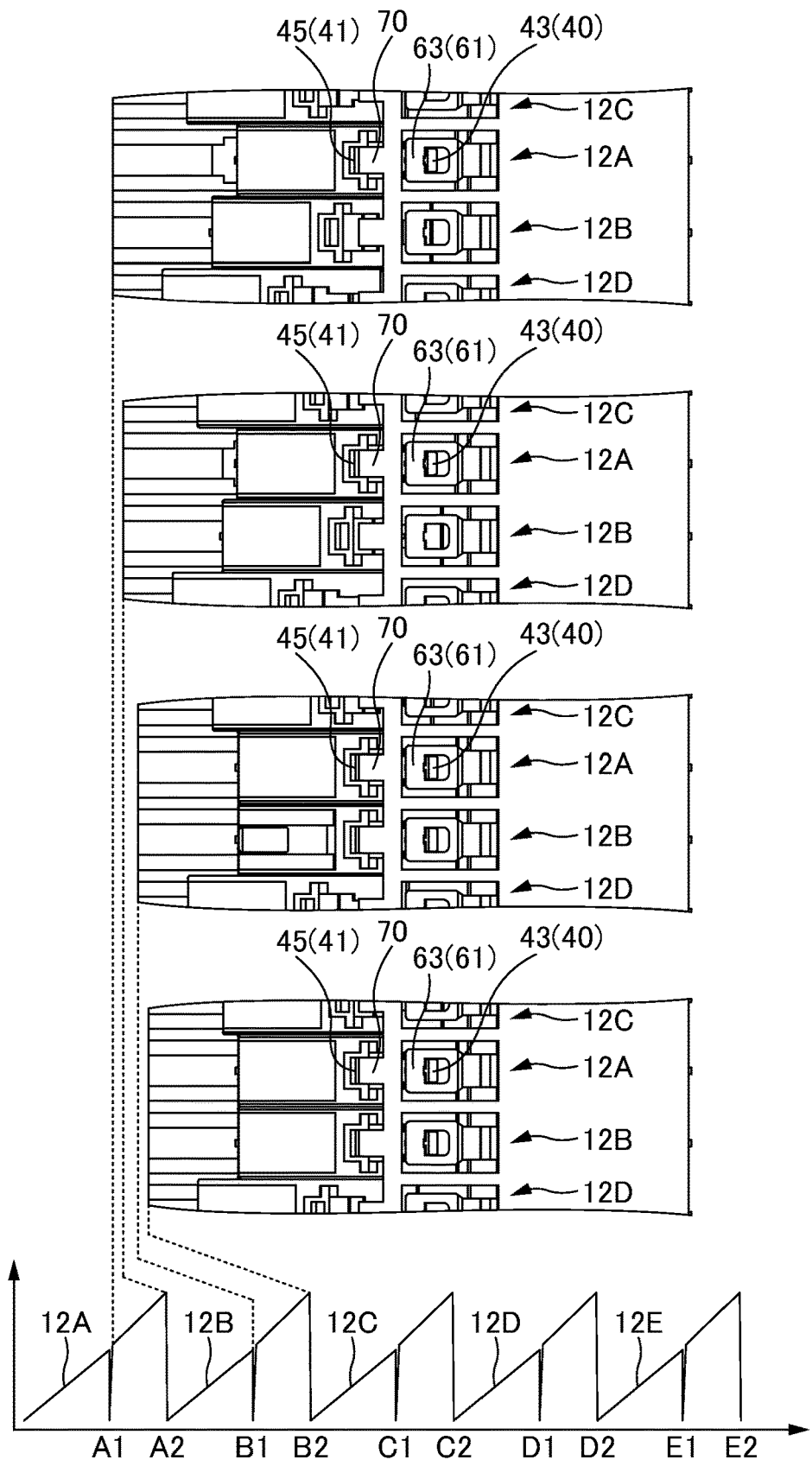
FIG. 5 is a diagram illustrating a relationship between a position of an optical plug 10 with respect to an optical receptacle 60 and stress received by the optical plug 10 when a plurality of plug-side inner connectors 12 mate with a receptacle-side housing 61 in stages in the optical connector 1 according to one or more embodiments.

FIG. 5 is a diagram illustrating a relationship between a position of the optical plug 10 with respect to the optical receptacle 60 and stress received by the optical plug 10 when the plurality of plug-side inner connectors 12 mate with the receptacle-side housing 61 in stages, in the optical connector 1 according to one or more embodiments.

As described above, when the operator moves the optical plug 10 toward the optical receptacle 60 for the connection of the optical connector 1, the stress received by the optical plug 10 is increased by the elastic force of the plug-side spring 32 and the receptacle-side spring 65 until immediately before the housing engagement state, and decreases at the stage of the housing engagement state. When the operator further moves the optical plug 10 toward the optical receptacle 60 from the housing engagement state, the stress received by the optical plug 10 immediately before the housing engagement state further increases and reaches a maximum immediately before the floating state.

If all of the plurality of (five) plug-side inner connectors 12 according to one or more embodiments are disposed in the same position in the front-rear direction in the plug-side outer housing 11, the plurality of (five) plug-side inner connectors 12 mate with the receptacle-side housing 61 at the same time. In this case, the stress received by the optical plug 10 that reaches a maximum immediately before the floating state also increases accordingly by an amount corresponding to the plurality of (five) plug-side inner connectors 12. Attachment/detachment of such a multicore optical connector 1 needs a jig and/or the like, which may reduce operability of the attachment/detachment operation. When such a multicore optical connector 1 is mounted in high density to a panel and/or the like, it may be difficult to secure a place where a jig is provided to attach and detach the optical connector 1.

In the optical connector 1 according to one or more embodiments, as illustrated in FIGS. 2 and 5, the plurality of plug-side inner connectors 12 of the optical plug 10 are provided so as to mate with the receptacle-side housing 61 in stages. In other words, the positions in the front-rear direction of the plurality of plug-side inner connectors 12 are disposed in stages from the front side in the plug-side outer housing 11. Thus, the stress received by the optical plug 10 illustrated in FIGS. 3A to 4C is applied in stages to each of the plurality of plug-side inner connectors 12, as illustrated on a lower part in FIG. 5. In this way, it is possible to reduce the stress received by the optical plug 10, and easily connect the multicore optical connector.

In the optical connector 1 according to one or more embodiments, the plug-side inner connector 12A located at the center among the plurality of plug-side inner connectors 12 (the plug-side inner connector 12A to the plug-side inner connector 12E) arranged in the left-right direction in the plug-side outer housing 11 enters the floating state first. In this way, the plug-side inner connector 12A located at the center among the plurality of plug-side inner connectors 12 mates with the receptacle-side housing 61 first. In other words, some plug-side inner connectors 12 (for example, the plug-side inner connector 12A) among the plurality of plug-side inner connectors 12 are preceded and connected to the corresponding receptacle-side housing 61, and some plug-side inner connectors 12 (the plug-side inner connector 12A) also enter the floating state with respect to the plug-side outer housing 11. This can reduce an inclination of the optical plug 10 when the optical plug 10 is connected to the optical receptacle 60.

In the optical connector 1 according to one or more embodiments, after the plug-side inner connector 12A located at the center enters the floating state, the plug-side inner connector 12B on the right side of the plug-side inner connector 12A enters the floating state. Then, after the plug-side inner connector 12B enters the floating state, the plug-side inner connector 12C on the side opposite to the plug-side inner connector 12B with respect to the plug-side inner connector 12A in the left-right direction enters the floating state. Note that the plug-side inner connector 12C is located on the left side of the plug-side inner connector 12A located at the center. In this way, after the plug-side inner connector 12A located at the center mates with the receptacle-side housing 61, the plug-side inner connectors 12 (the plug-side inner connector 12B and the plug-side inner connector 12C) located on both sides of the plug-side inner connector 12A located at the center mate with the receptacle-side housing 61. This can reduce an inclination of the optical plug 10 when the optical plug 10 is connected to the optical receptacle 60.

As illustrated on the lower part in FIG. 5, in one or more embodiments, when the optical plug 10 and the optical receptacle 60 are connected to each other, the plug-side ferrules 31 of the plug-side inner connector 12B and the receptacle-side ferrules 64 start to butt against each other, immediately after the stage (A2) at which the plug-side inner connector 12A enters the floating state. This can reduce the stress received by the optical plug 10, and easily connect the multicore optical connector.

Figure 6A:
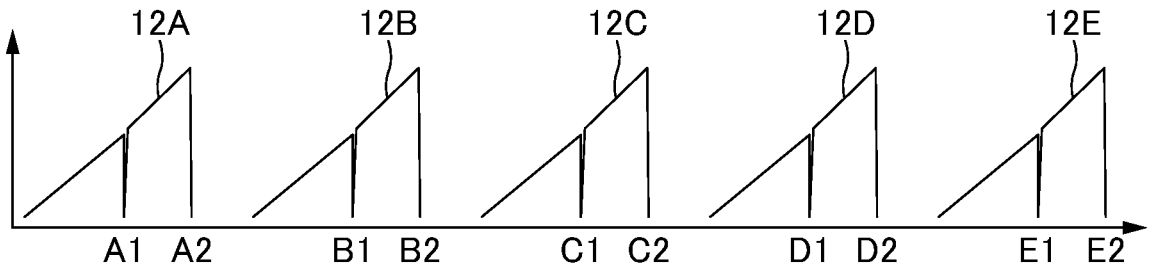
FIGS. 6A to 6C are diagrams illustrating a relationship between a position of an optical plug 10 with respect to an optical receptacle 60 and stress received by the optical plug 10 when a plurality of plug-side inner connectors 12 mate with a receptacle-side housing 61 in stages in an optical connector 1 according to one or more embodiments.
Figure 6B:
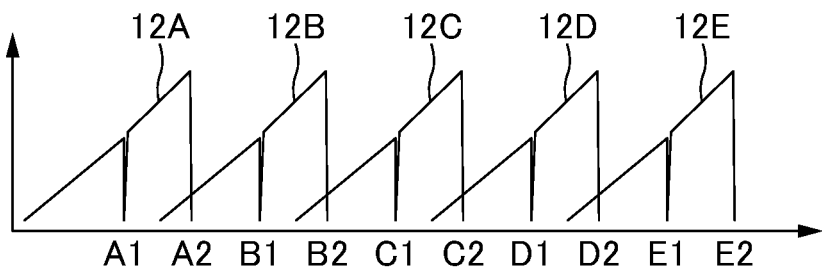
Figure 6C:
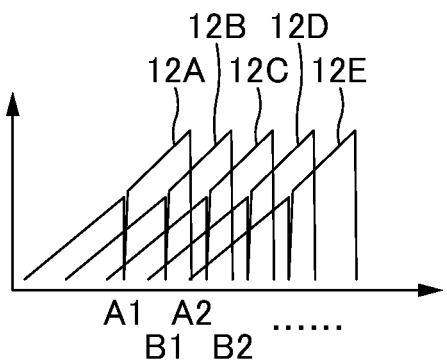

FIGS. 6A to 6C are diagrams illustrating a relationship between a position of an optical plug 10 with respect to an optical receptacle 60 and stress received by the optical plug 10 when a plurality of plug-side inner connectors 12 mate with a receptacle-side housing 61 in stages in an optical connector 1 according to one or more embodiments.

As illustrated in FIG. 6A, when the optical plug 10 and the optical receptacle 60 are connected to each other, after a stage (A2) at which the plug-side inner connector 12A enters the floating state, plug-side ferrules 31 of the plug-side inner connector 12B and the receptacle-side ferrules 64 start to butt against each other. In the example illustrated in FIG. 6A as compared to the example illustrated in FIG. 5, there is an interval between the stage (A2) at which one plug-side inner connector 12A enters the floating state and the stage at which the plug-side ferrules 31 of another plug-side inner connector 12B and the receptacle-side ferrules 64 start to butt against each other. This can also reduce the stress received by the optical plug 10, and easily connect the multicore optical connector.

As illustrated in FIG. 6B, when the optical plug 10 and the optical receptacle 60 are connected to each other, after a stage (A1) at which the plug-side inner connector 12A enters the housing engagement state, the plug-side ferrules 31 of the plug-side inner connector 12B and the receptacle-side ferrules 64 start to butt against each other. In the example illustrated in FIG. 6B as compared to the example illustrated in FIG. 5, before the stage (A2) at which the plug-side inner connector 12A enters the floating state, the plug-side ferrules 31 of the plug-side inner connector 12B and the receptacle-side ferrules 64 start to butt against each other. However, elastic force of the spring (the plug-side spring 32 and the receptacle-side spring 65) is also relatively small at an early stage of the ferrules (the plug-side ferrules 31 and the receptacle-side ferrules 64) butting against each other, and thus it is possible to reduce the stress received by the optical plug 10, and easily connect the multicore optical connector.

As illustrated in FIG. 6C, when the optical plug 10 and the optical receptacle 60 are connected to each other, before the stage (A1) at which the plug-side inner connector 12A enters the housing engagement state, the plug-side ferrules 31 of the plug-side inner connector 12B and the receptacle-side ferrules 64 start to butt against each other. In this case also, the floating states (A2 to E2) in which the stress received by the optical plug 10 reaches a maximum are in stages, and thus it is possible to reduce the stress received by the optical plug 10, and easily connect the multicore optical connector.

Disconnection Procedure of Optical Connector 1

Figure 7A:
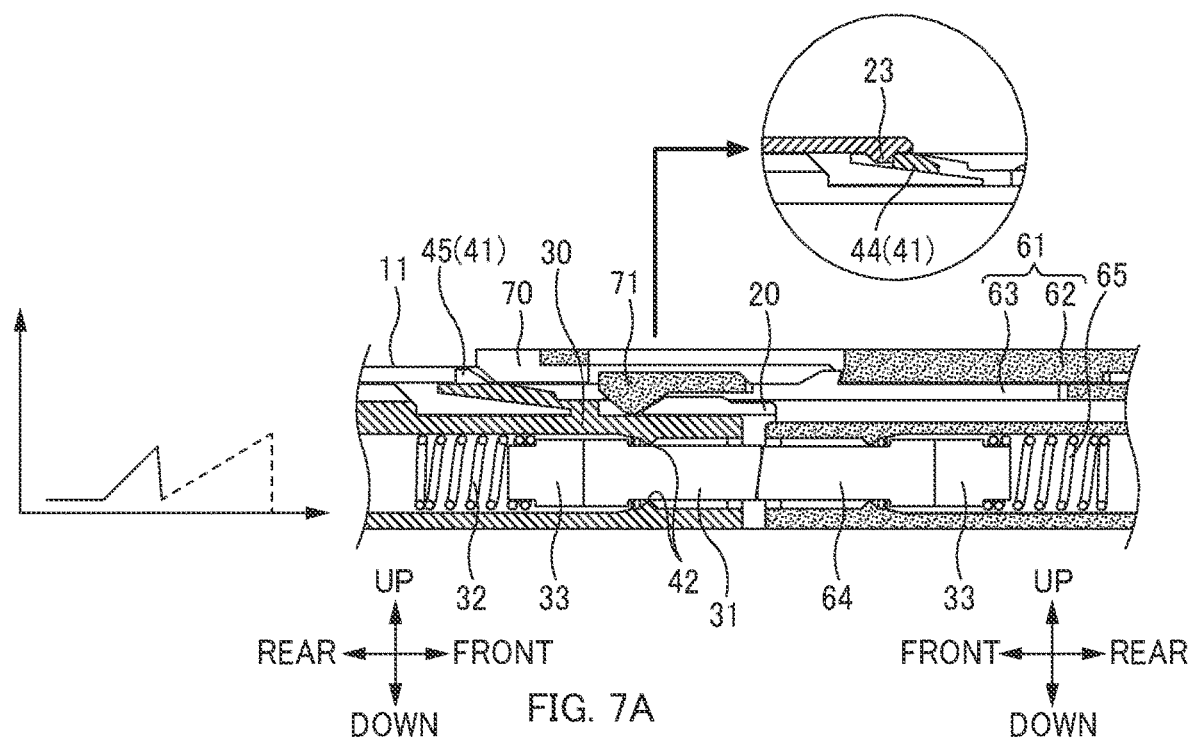
FIGS. 7A and 7B are cross-sectional views illustrating a situation where the optical connector 1 according to one or more embodiments is disconnected.
Figure 7B:
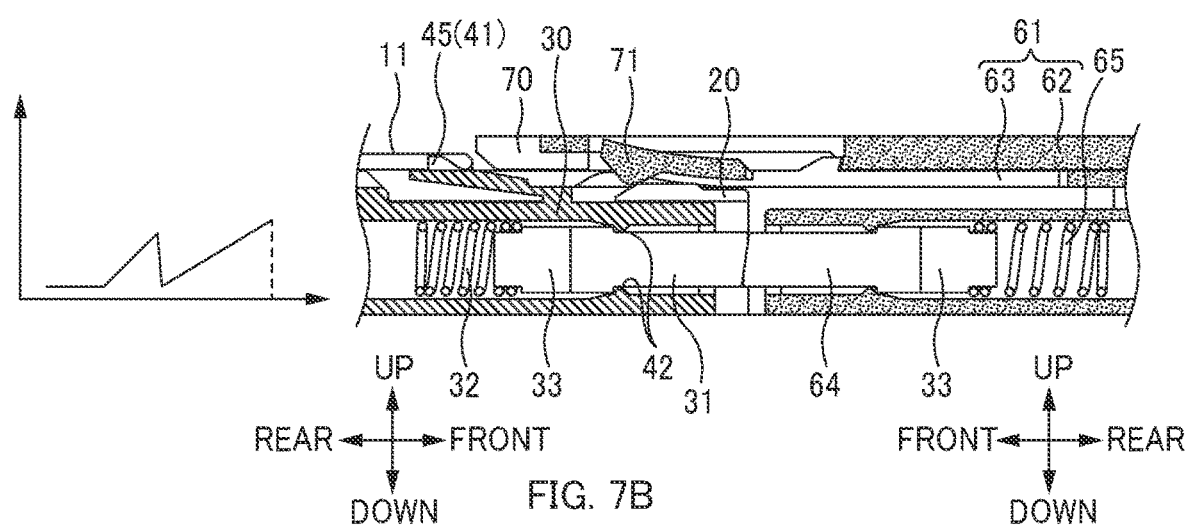

FIGS. 7A and 7B are cross-sectional views illustrating a situation where the optical connector 1 according to one or more embodiments is disconnected. Before the disconnection of the optical connector 1, that is, before the optical plug 10 is disconnected from the optical receptacle 60, locking of the elastic locking section 41 of the plug-side inner housing 30 with the locked section 23 of a plug-side outer housing 11 is unlocked, thereby entering the unlocked state. This enables the plug-side inner housing 30 to move rearward (to the side opposite to the optical receptacle 60) with respect to the plug-side outer housing 11.

At the stage illustrated in FIG. 7A, such a state, in which a pressing part 70 of a receptacle-side outer housing 62 elastically deforms the elastic locking section 41 of the plug-side inner housing 30 toward the plug-side ferrule 31 side (lower side in FIG. 7A), is released. In other words, the elastic locking section 41 of the plug-side inner housing 30 is locked again by the locked section 23 of the plug-side outer housing 11. The plug-side outer housing 11 and the plug-side inner housing 30 enter the locked state again, thereby restricting the movement of the plug-side inner housing 30 to the rear side (to the side opposite to the optical receptacle 60) with respect to the plug-side outer housing 11.

At the stage illustrated in FIG. 7A, the plug-side inner housing 30 and a receptacle-side inner housing 63 have a predetermined positional relationship, and the plug-side spring 32 and the receptacle-side spring 65 are compressed and deformed by a predetermined amount. Thus, the stress received by the optical plug 10 is not affected by the elastic force of the plug-side spring 32 and the receptacle-side spring 65. However, stress is applied for releasing the state in which the pressing part 70 of the receptacle-side outer housing 62 elastically deforms the elastic locking section 41 of the plug-side inner housing 30 toward the plug-side ferrule 31 side (lower side in FIG. 7A), and for locking again the elastic locking section 41 of the plug-side inner housing 30 by the locked section 23 of the plug-side outer housing 11.

At a stage illustrated in FIG. 7B, the engagement piece 43 of the engaging section 40 of the plug-side inner housing 30 having engaged with the engagement hole 73 of the engaged section 71 of the receptacle-side inner housing 63, is released therefrom, the plug-side inner housing 30 and the receptacle-side inner housing 63 having been maintained in the predetermined positional relationship are spaced, and abutment plane (mechanical reference plane) having been fixed to the endfaces of the plug-side ferrule 31 and the receptacle-side ferrule 64, is released therefrom. At this time, the plug-side spring 32 and the receptacle-side spring 65 deformed by the predetermined amount gradually return to their original lengths due to the spacing between the plug-side inner housing 30 and the receptacle-side inner housing 63. Also, at the stage illustrated in FIG. 7B, the optical plug 10 is applied with the stress for releasing the state in which the engagement piece 43 of the engaging section 40 of the plug-side inner housing 30 engages with the engagement hole 73 of the engaged section 71 of the receptacle-side inner housing 63.

In the optical connector 1 according to one or more embodiments, in the case of disconnection also, it is possible to reduce the stress received by the optical plug 10 described above, and easily disconnect the multicore optical connector, since the plug-side inner connectors 12 are provided such that the plug-side inner connectors 12 having mated with the receptacle-side housing 61 is released therefrom in stages in order from the plug-side inner connectors 12 located on both left and right ends to the plug-side inner connector 12 located at the center in the plug-side outer housing 11.

Modifications

Optical Connector 1 of First Modification

Figure 8A:
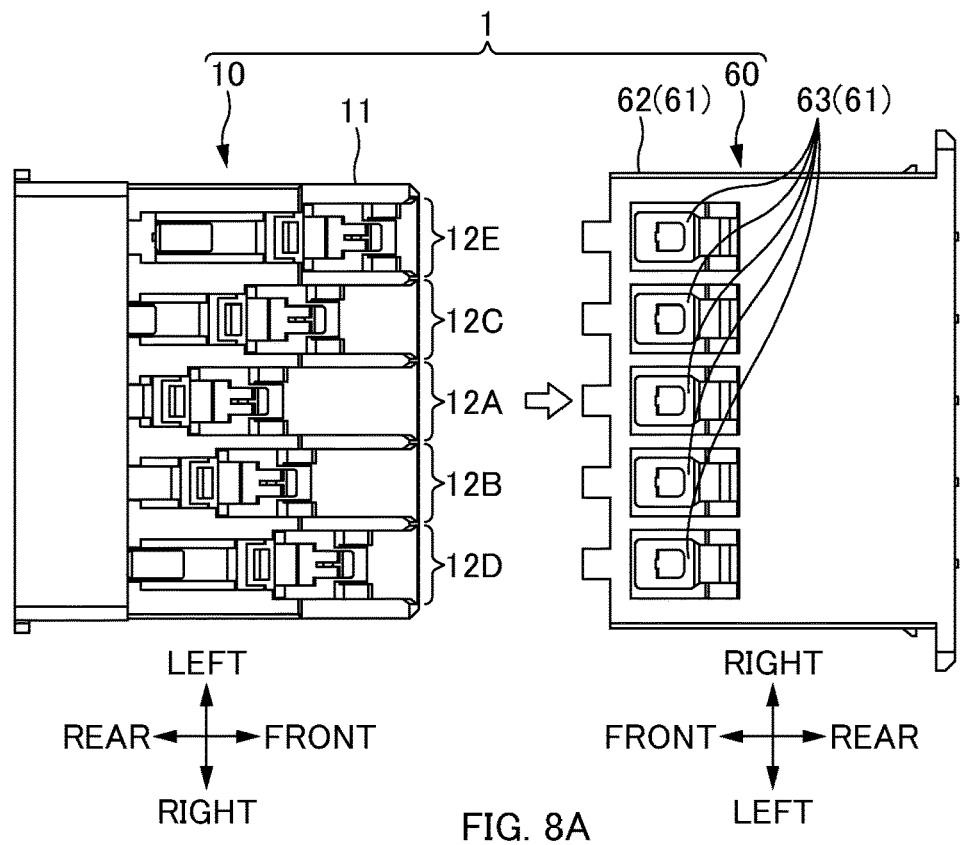
FIG. 8A is a front view of the optical connector 1 according to a first modification.

FIG. 8A is a front view of the optical connector 1 according to a first modification. In the optical connector 1 according to the embodiments described above, the plug-side inner connectors 12 are provided so as to mate with the receptacle-side housing 61 in stages in order from the plug-side inner connector 12 located at the center to the plug-side inner connectors 12 located on both left and right ends in the plug-side outer housing 11 of the optical plug 10. In other words, the plug-side inner connectors 12 are arranged at positions in the front-rear direction in order from the plug-side inner connector 12A to the plug-side inner connector 12E from the front side in the plug-side outer housing 11 (see FIG. 2). However, the order of the plug-side inner connectors 12 mating with the receptacle-side housing 61 is not limited thereto. As illustrated in FIG. 8A, the plug-side inner connectors 12 may be provided so as to mate with the receptacle-side housing 61 in stages in order from the plug-side inner connectors 12 located on both left and right ends to the plug-side inner connector 12 located at the center in the plug-side outer housing 11. In other words, the plug-side inner connectors 12 may be arranged at positions in the front-rear direction in order from the plug-side inner connector 12E to the plug-side inner connector 12A from the front side in the plug-side outer housing 11.

As described above, the plug-side inner connectors 12 are provided so as to mate with the receptacle-side housing 61 in stages in order from the plug-side inner connector 12 located at the center to the plug-side inner connectors 12 located on both left and right ends in the plug-side outer housing 11, thereby being able to reduce an inclination of the optical plug 10 when the optical plug 10 is connected to the optical receptacle 60. However, when such an inclination of the optical plug 10 is small, the plug-side inner connectors 12 may be provided so as to mate with the receptacle-side housing 61 in stages in order from the plug-side inner connectors 12 located on both left and right ends to the plug-side inner connector 12 located at the center. Also in such an optical connector 1 according to the first modification, the plug-side inner connectors 12 mate with the receptacle-side housing 61 in stages. Thus, it is possible to reduce the stress received by the optical plug 10 at the time of connection of the optical connector 1, thereby being able to easily attach and detach the multicore optical connector.

Optical Connector 1 of Second Modification

Figure 8B:
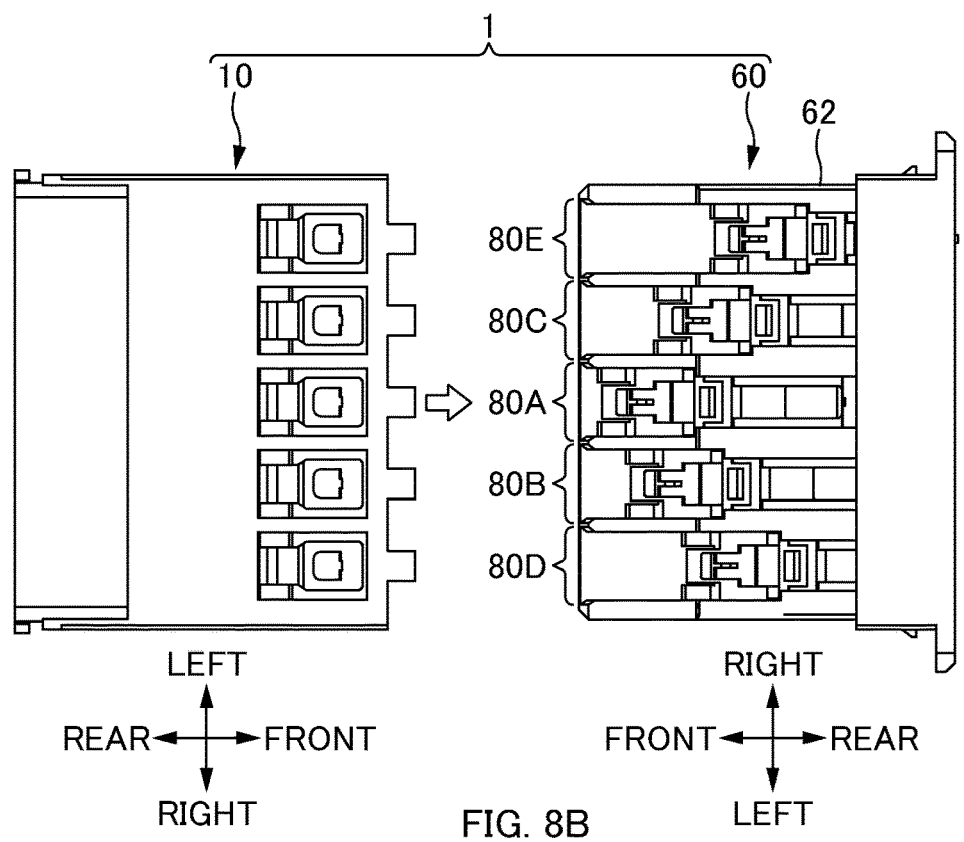
FIG. 8B is a front view of the optical connector 1 according to a second modification.

FIG. 8B is a front view of the optical connector 1 according to a second modification. In the optical connector 1 according to the embodiments described above, the plug-side inner connectors 12 are provided so as to mate with the receptacle-side housing 61 in stages. However, the inner connectors that mate in stages may be provided on the optical receptacle 60 side. As illustrated in FIG. 8B, receptacle-side inner connectors 80 may be provided so as to mate with the plug-side housing (the plug-side inner housing 30 and the plug-side outer housing 11) in stages in order from the receptacle-side inner connector 80 located at the center to the receptacle-side inner connectors 80 located on both left and right ends in the receptacle-side outer housing 62. In other words, the receptacle-side inner connectors 80 may be arranged at positions in the front-rear direction in order from the receptacle-side inner connector 80A to the receptacle-side inner connector 80E from the front side in the receptacle-side outer housing 62. Also in such an optical connector 1 according to the second modification, the receptacle-side inner connectors 80 mate with the plug-side housing in stages. This can reduce the stress received by the optical plug 10 at the time of connection of the optical connector 1, thereby being able to easily attach and detach the multicore optical connector.

BRIEF SUMMARY

As illustrated in FIG. 2, the optical connector 1 according to the embodiments described above is an optical connector that butt-couples the plurality of plug-side ferrules 31 (first ferrules) housed in the plug-side housing (first housing) and the plurality of receptacle-side ferrules 64 (second ferrules) housed in the receptacle-side housing 61 (second housing), respectively, by mating the plug-side housing and the receptacle-side housing 61. In the embodiments described above, the plug-side housing includes the plurality of plug-side inner housings 30 (first inner housings) and the plug-side outer housing 11 (first outer housing), the plurality of plug-side inner housings 30 each housing at least one plug-side ferrule 31 of the plurality of plug-side ferrules 31, the plug-side outer housing 11 being releasable from the plurality of plug-side inner housings 30, the plurality of plug-side inner housings 30 and the receptacle-side housing 61 are mated in stages, and, when each of the plurality of plug-side inner housings 30 and the receptacle-side housing 61 are mated, the plug-side inner housing 30 to be mated of the plug-side inner housings 30 is released from the plug-side outer housing 11. In this way, in the embodiments described above, a multicore optical connector can be easily attached and detached.

As illustrated in FIG. 2, the optical connector 1 according to the embodiments described above is an optical connector including the optical plug 10 (first connector) and the optical receptacle 60 (second connector). In the embodiments described above, the optical plug 10 includes the plurality of plug-side inner housings 30 (first inner housings) that house the plug-side ferrules 31 (first ferrules) so as to be retractable, and the plug-side outer housing 11 (first outer housing) that houses the plurality of plug-side inner housings 30. The optical receptacle 60 includes the receptacle-side inner housings 63 each housing the plurality of receptacle-side ferrules 64 (second ferrules) so as to be retractable. When the optical plug 10 and the optical receptacle 60 are connected to each other by approximating the relative positions of the optical plug 10 and the optical receptacle 60, a state is switched from the locked state, in which the plug-side inner housings 30 and the plug-side outer housings 11 are locked to each other, to the floating state, in which the plug-side inner housings 30 are movable with respect to the plug-side outer housing 11, by releasing the locked state, while maintaining the housing engagement state, in which the plug-side inner housings 30 and the receptacle-side inner housings 63 engage with each other by causing the plug-side ferrules 31 and the receptacle-side ferrules 64 to butt against each other is maintained. The relative positions at which one plug-side inner housing 30 of the plurality of plug-side inner housings 30 is switched from the locked state to the floating state are different from the relative positions at which another plug-side inner housing 30 is switched from the locked state to the floating state. In this way, in the embodiments described above, a multicore optical connector can be easily attached and detached.

As illustrated in FIGS. 5 to 6B, in the optical connector 1 according to the embodiments described above, the plurality of plug-side inner housings 30 include one plug-side inner housing 30 and another plug-side inner housing 30, and when the plug-side housing and the receptacle-side housing 61 are mated, the one plug-side inner housing 30 mates with the receptacle-side housing 61 and thereafter the at least one plug-side ferrule 31 of the other plug-side inner housing 30 starts to butt against the corresponding at least one receptacle-side ferrule 64 of the receptacle-side ferrules 64 of the receptacle-side housing 61. In this way, a multicore optical connector can be easily attached and detached.

As illustrated in FIGS. 5 to 6A, in the optical connector 1 according to the embodiments described above, the plurality of plug-side inner housings 30 include one plug-side inner housing 30 and another plug-side inner housing 30, and when the plug-side housing and the receptacle-side housing 61 are mated, the one plug-side inner housing 30 is released from the plug-side outer housing 11 and thereafter the at least one plug-side ferrule 31 of the other plug-side inner housing 30 starts to butt against the corresponding at least one receptacle-side ferrule 64 of the receptacle-side ferrules 64 of the receptacle-side housing 61. In this way, a multicore optical connector can be easily attached and detached.

As illustrated in FIG. 5, in the optical connector 1 according to the embodiments described above, the plurality of plug-side inner housings 30 include at least three plug-side inner housings 30, the three plug-side inner housings 30 are aligned in a perpendicular direction that is perpendicular to a direction in which the plug-side housing and the receptacle-side housing 61 are mated, and, when the plug-side housing and the receptacle-side housing 61 are mated, the three plug-side inner housings 30 are released from the plug-side outer housing 11 in order of 1) a first one, of the three plug-side inner housings 30, located at the center in the plug-side housing, 2) a second one, of the three plug-side inner housings 30, different from the first one located at the center, and 3) a third one, of the three plug-side inner housings 30, located on an opposite side to the second one with respect to the first one located at the center, in the perpendicular direction. This can reduce an inclination of the optical plug 10 when connecting the optical plug 10 to the optical receptacle 60.

In the optical connector 1 according to the embodiments described above, when the plug-side housing and the receptacle-side housing 61 are unmated after being mated, the plurality of plug-side inner housings 30 and the plug-side outer housing 11 are locked in stages. In this way, a multicore optical connector can be easily attached and detached.

The optical connector 1 according to the embodiments described above is an optical connector that butt-couples the plurality of plug-side ferrules 31 (first ferrules) housed in the plug-side housing (first housing) and the plurality of receptacle-side ferrules 64 (second ferrules) housed in the receptacle-side housing 61 (second housing), respectively, by mating the plug-side housing and the receptacle-side housing 61. In the embodiments described above, the plug-side housing includes the plurality of plug-side inner housings 30 (first inner housings) and the plug-side outer housing 11 (first outer housing), the plurality of plug-side inner housings 30 each housing at least one plug-side ferrule 31 of the plurality of plug-side ferrules 31, the plug-side outer housing 11 being configured to be locked to the plurality of plug-side inner housings 30, and, when the plug-side housing and the receptacle-side housing 61 are unmated after being mated, the plurality of plug-side inner housings 30 and the plug-side outer housing 11 are locked in stages. In this way, in the embodiments described above, a multicore optical connector can be easily attached and detached.

A method for connecting the optical connector 1 according to the embodiments described above is a method for connecting an optical connector that butt-couples the plurality of plug-side ferrules 31 (first ferrules) housed in the plug-side housing (first housing) and the plurality of receptacle-side ferrules 64 (second ferrules) housed in the receptacle-side housing 61 (second housing), respectively, by mating the plug-side housing and the receptacle-side housing 61. In the embodiments described above, the method comprises: preparing the plug-side housing, the plug-side housing including the plurality of plug-side inner housings 30 (first inner housings) and the plug-side outer housing 11 (first outer housing), the plurality of plug-side inner housings 30 each housing at least one plug-side ferrule 31 of the plurality of plug-side ferrules 31, the plug-side outer housing 11 being releasable from the plurality of plug-side inner housings 30; mating the plurality of plug-side inner housings 30 and the receptacle-side housing 61 in stages; and when each of the plurality of plug-side inner housings 30 and the receptacle-side housing 61 are mated, releasing locking between a plug-side inner housing 30 to be mated of the plug-side inner housings 30 and the plug-side outer housing 11. In this way, in the embodiments described above, a multicore optical connector can be easily attached and detached.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Optical connector;
2, 3: Optical fiber;
6: Front panel;
10: Optical plug (first connector);
11: Plug-side outer housing (first outer housing);
12 (12A to 12E): Plug-side inner connector (first inner connector);
13: Connection holding part;
14: Cover part;
15: Cable tube part;
16: Operating lever;
17: Operating rotation shaft;
18: Latch part;
20: Front end part;
21: Projection;
22: Window part;
23: Locked section;
24: Front inclined surface;
25: Rear inclined surface;
30: Plug-side inner housing (first inner housing);
31: Plug-side ferrule (first ferrule);
32: Plug-side spring (first spring);
33: Pin clamp;
35: Ferrule flange part;
36: Ferrule pin;
40: Engaging section;
41: Elastic locking section;
42: Protrusion for preventing coming off from the front side;
43: Engagement piece;
44: Locking piece;
45: Pressed protrusion;
60: Optical receptacle (second connector);
61: Receptacle-side housing (second housing);
62: Receptacle-side outer housing;
63: Receptacle-side inner housing;
64: Receptacle-side ferrule (second ferrule);
65: Receptacle-side spring (second spring);
66: Panel attachment part;
67: Latch protrusion;
70: Pressing part;
71: Engaged section;
72: Engagement projection;
73: Engagement hole;
80 (80A to 80E): Receptacle-side inner connector.

The invention claimed is:

1. An optical connector comprising:
a plurality of first ferrules;
a first housing that houses the plurality of first ferrules and that comprises:
a plurality of first inner housings; and
a first outer housing;
a plurality of second ferrules; and
a second housing that houses the plurality of second ferrules, wherein the optical connector butt-couples the plurality of first ferrules and the plurality of second ferrules, respectively, by mating the first housing and the second housing, each of the plurality of first inner housings houses at least one of the plurality of first ferrules, the first outer housing is releasable from the plurality of first inner housings, the plurality of first inner housings and the second housing are mated in stages, and when each of the plurality of first inner housings and the second housing are mated, each of the plurality of first inner housings to be mated is released from the first outer housing.

2. The optical connector according to claim 1, wherein
when the first housing and the second housing are mated, one of the first inner housings mates with the second housing, and after the one of the first inner housings is mated with the second housing, one of the first ferrules of another one of the first inner housings butts against at least one corresponding second ferrule of the plurality of second ferrules.

3. The optical connector according to claim 1, wherein
when the first housing and the second housing are mated, one of the first inner housings is released from the first outer housing, and after the one of the first inner housings is released from the first outer housing, one of the first ferrules of another one of the first inner housings butts against at least one corresponding second ferrule of the plurality of second ferrules.

4. The optical connector according to claim 1, wherein
the plurality of first inner housings includes at least three first inner housings, the three first inner housings are aligned in a perpendicular direction that is perpendicular to a direction in which the first housing and the second housing are mated, and when the first housing and the second housing are mated, the three first inner housings are released from the first outer housing in order of:
1) a first one of the three first inner housings that is located at the center in the first housing,
2) a second one of the three first inner housings that is not located at the center, and
3) a third one of the three first inner housings that is located on an opposite side of the second one with respect to the first one, in the perpendicular direction.

5. The optical connector according to claim 1, wherein
when the first housing and the second housing are unmated after being mated, the plurality of first inner housings and the first outer housing are locked in stages.

6. An optical connector comprising:
a plurality of first ferrules;
a first housing that houses the plurality of first ferrules and that comprises:
a plurality of first inner housings; and
a first outer housing;
a plurality of second ferrules; and
a second housing that houses the plurality of second ferrules, wherein
the optical connector butt-couples the plurality of first ferrules and the plurality of second ferrules, respectively, by mating the first housing and the second housing each of the plurality of first inner housings houses at least one first ferrule of the plurality of first ferrules, the first outer housing locks to the plurality of first inner housings, and when the first housing and the second housing are unmated after being mated, the plurality of first inner housings and the first outer housing are locked in stages.

7. A method for connecting an optical connector that butt-couples a plurality of first ferrules housed in a first housing and a plurality of second ferrules housed in a second housing, respectively, by mating the first housing and the second housing, the method comprising:
preparing the first housing,
wherein the first housing comprises:
a plurality of first inner housings; and
a first outer housing,
each of the plurality of first inner housings houses at least one first ferrule of the plurality of first ferrules, and
the first outer housing is releasable from the plurality of first inner housings;
mating the plurality of first inner housings and the second housing in stages; and
when each of the plurality of first inner housings and the second housing are mated, releasing locking between each of the plurality of first inner housings to be mated and the first outer housing.

* * * * *